United States Patent [19]

Kiss et al.

[11] Patent Number: 5,672,931
[45] Date of Patent: *Sep. 30, 1997

[54] ARC LAMP FILTER WITH HEAT TRANSFER ATTACHMENT TO A RADIAL ARC LAMP CATHODE HEAT SINK

[75] Inventors: John Kiss, San Jose; Roy D. Roberts, Newark, both of Calif.

[73] Assignee: ILC Technology, Inc., Sunnyvale, Calif.

[*] Notice: The term of this patent shall not extend beyond the expiration date of Pat. No. 5,561,338.

[21] Appl. No.: 537,009

[22] Filed: Oct. 2, 1995

[51] Int. Cl.$^6$ .................................................. H01J 1/02
[52] U.S. Cl. .................. 313/44; 313/46; 313/24; 313/35
[58] Field of Search .................. 313/44, 46, 24, 313/35; 165/104.33, 185, 80.3; 362/96, 294, 261, 373

[56] References Cited

U.S. PATENT DOCUMENTS 5,561,338 10/1996 Roberts et al. .................. 313/46

*Primary Examiner*—Sandra L. O'Shea
*Assistant Examiner*—Vip Patel
*Attorney, Agent, or Firm*—Thomas E. Schatzel; Law Offices of Thomas E. Schatzel A Prof. Corporation

[57] ABSTRACT

A spectral filter and mounting assembly comprising a flat quartz disk with coatings to control the light spectrum, a heat transfer adapter, a split-ring retainer for use in a drop-in arc lamp assembly that includes an arc lamp with fitted cathode and anode heat sinks each including a thin-wall copper strip that is brazed in pleated folds between inner and outer cylindrical rings to create cooling fins. The drop-in lamp assembly also includes an insulative sleeve in which the arc lamp and heat sinks are disposed and a pair of connection bushings piercing the wall of the sleeve and providing an electrical connection to the arc lamp outside the sleeve. The arc lamp includes a copper heat conduction flange that surrounds a front window reduced in diameter from the diameter of the arc lamp. The flange conducts heat generated in the window and the spectral filter during operation directly to the cathode heat sink. Both heat sinks are forced-air cooled by the fan, thus cooling the window and the spectral filter.

12 Claims, 3 Drawing Sheets

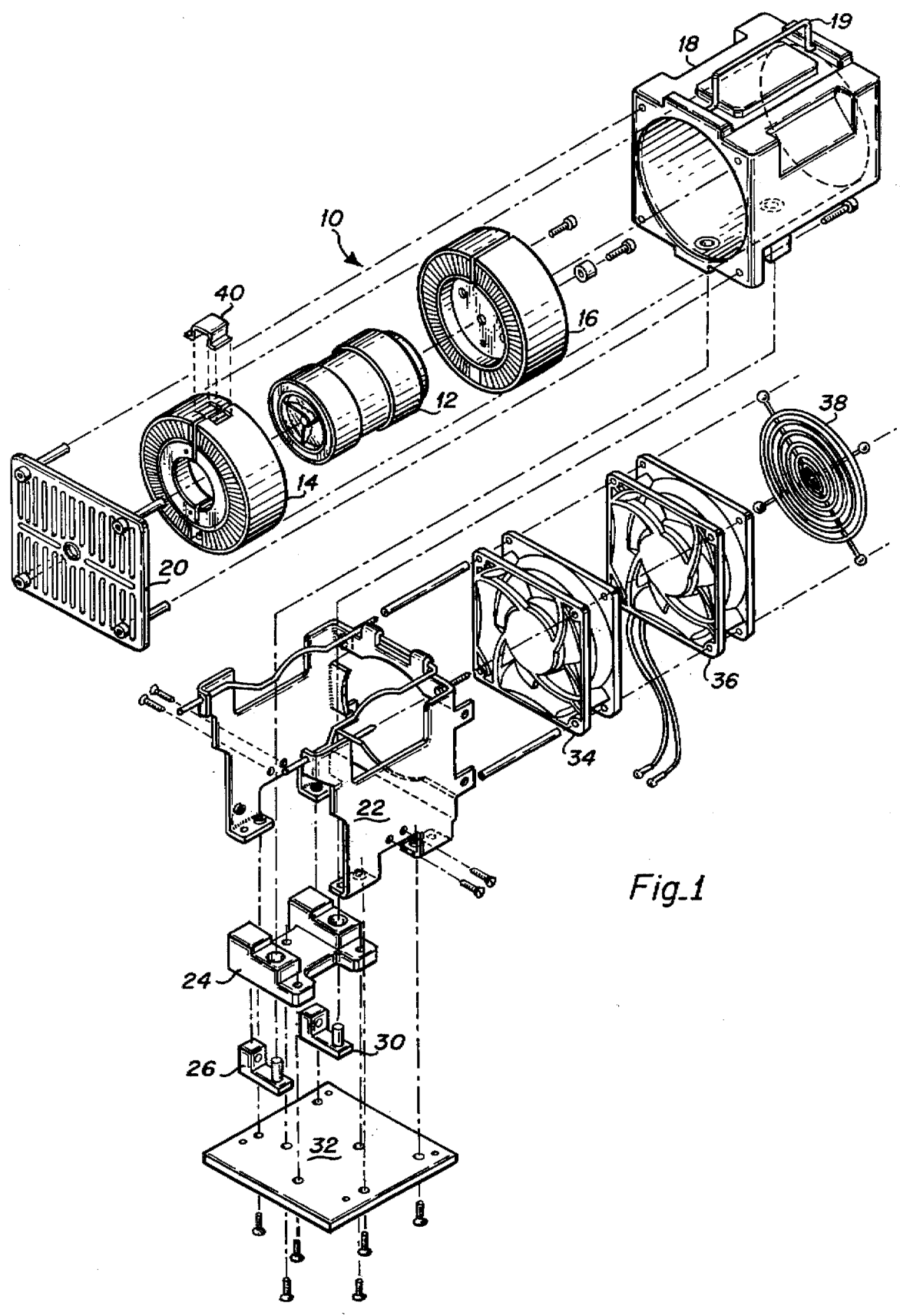
Fig_1

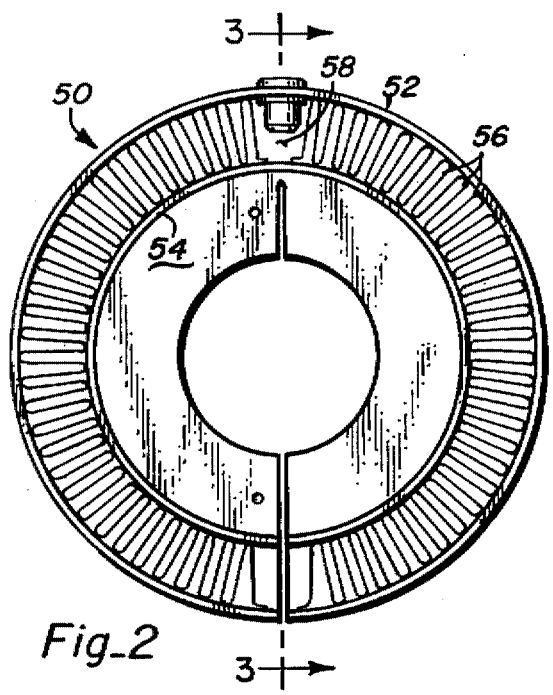
Fig_2
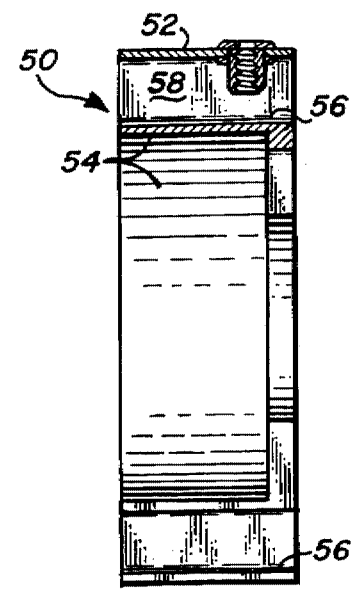
Fig_3
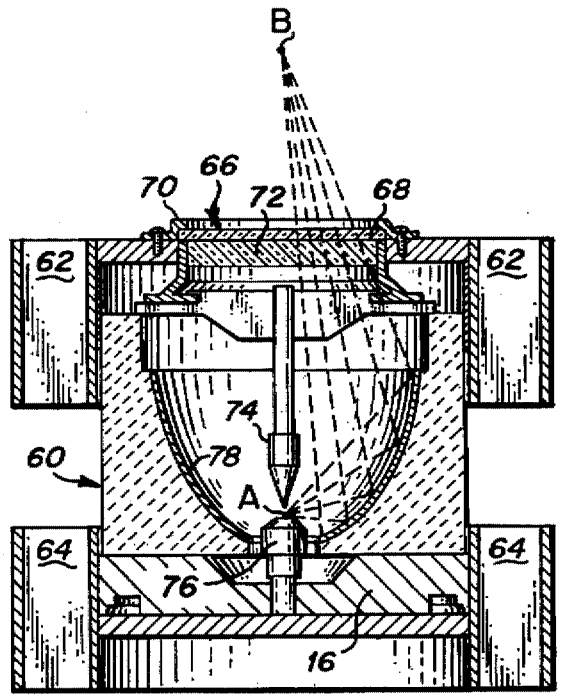
Fig_4
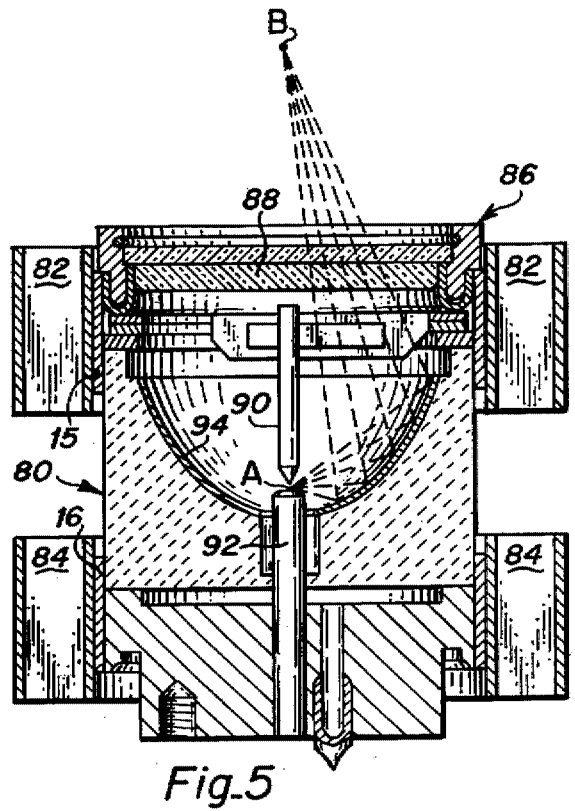
Fig_5

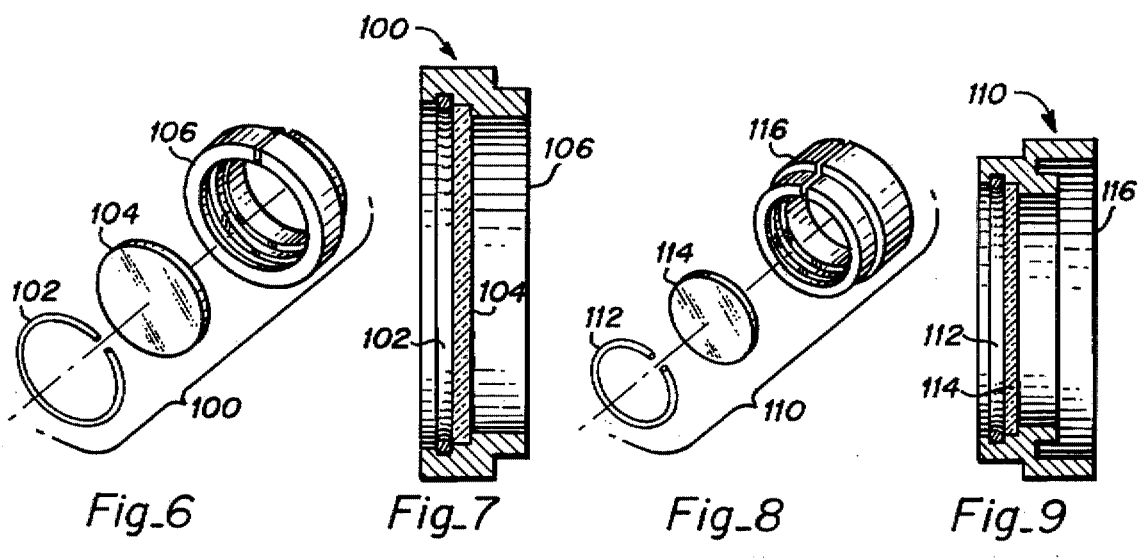
Fig_6    Fig_7    Fig_8    Fig_9

ARC LAMP FILTER WITH HEAT TRANSFER ATTACHMENT TO A RADIAL ARC LAMP CATHODE HEAT SINK

BACKGROUND OF THE INVENTION

1. Field of the Invention

The invention relates generally to arc lamps and specifically to spectral filters for such lamps with heat sinks.

2. Description of the Prior Art

Short arc lamps provide intense point sources of light that allow light collection in reflectors for applications in medical endoscopes, instrumentation and projection. Short arc lamps are used in industrial endoscopes for the inspection of jet engine interiors.

A typical short arc lamp comprises an anode and a cathode positioned along the longitudinal axis of a cylindrical, sealed concave chamber that contains a gas pressurized to several atmospheres. U.S. Pat. No. 4,633,128, issued Dec. 30, 1986, to Roy D. Roberts, the present inventor, and Robert L. Miner, describes such a short arc lamp in which a copper sleeve member is attached to the reflecting wall to conduct heat from the reflecting wall through to the exterior wall and eventually to circulating ambient air.

The lamp illustrated in FIG. 2 of Roberts, et al., can be operated at one kilowatt. At such high power levels, the heat generated is conventionally dispersed with heat sinks. However, prior art heat sinks for in excess of a thousand watts are large and bulky. Prior art heat sinks typically use aluminum extrusions that limit how thin the fins can be made. Extruding operations dictate fin thickness and spacing.

Very often the ultra-violet or infrared emissions of high-power arc lamps need to be controlled. Conventional filters often cannot be used because of the limited placement and mounting options available. Filters that are placed near the arc lamps themselves can heat and crack.

The prior art includes filters with separate optical components that are used to support a filter and its own dedicated heat sinks and fans. Such configurations are expensive, bulky and troublesome.

SUMMARY OF THE PRESENT INVENTION

It is therefore an object of the present invention to provide a spectral filter and mounting assembly for an integrated arc lamp module that can be operated at fifty to one thousand watts.

It is another object of the present invention to provide a spectral filter and mounting assembly for an integrated arc lamp module that can be added by a user in the field.

Briefly, a spectral filter and mounting assembly embodiment of the present invention comprises a flat quartz disk with coatings to control the light spectrum, a heat transfer adapter, a split-ring retainer for use in a drop-in arc lamp assembly that includes an arc lamp with fitted cathode and anode heat sinks each including a thin-wall copper strip that is brazed in pleated folds between inner and outer cylindrical rings to create cooling fins. The drop-in lamp assembly also includes an insulative sleeve in which the arc lamp and heat sinks are disposed and a pair of connection bushings piercing the wall of the sleeve and providing an electrical connection to the arc lamp outside the sleeve. A flush-mount receptacle for the drop-in lamp assembly includes a housing with a fan axially positioned behind the arc lamp and heat sinks when they are in place in the sleeve and dropped-into the housing. A glass epoxy board is attached to the housing supports and insulates electrical terminals that contact the bushings to power the arc lamp. The arc lamp includes a copper heat conduction flange that surrounds a front window reduced in diameter from the diameter of the arc lamp. The flange conducts heat generated in the window and the spectral filter during operation directly to the cathode heat sink. Both heat sinks are forced-air cooled by the fan, thus cooling the window and the spectral filter.

An advantage of the present invention is that a spectral filter assembly is provided that is compatible at all powers of lamp operation.

Another advantage of the present invention is that a spectral filter assembly is provided that is easy to add in the field to existing modular lamp systems.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is an exploded assembly view of a lamp system embodiment of the present invention;

FIG. 2 is an end view typical of the heat sinks included in the system of FIG. 1;

FIG. 3 is a cross-sectional view of the heat sink of FIG. 2 taken along the line 3—3;

FIG. 4 is a cross-sectional diagram of the arc lamp and spectral filter assembly included in the system of FIG. 1;

FIG. 5 is a diagram of a lamp assembly in a second embodiment that is similar to the first embodiment of FIG. 4, two alternative spectral filter assemblies and a different mounting are shown;

FIG. 6 is an exploded assembly view of one spectral filter assembly of FIG. 4;

FIG. 7 is a cross-sectional view of the embodiment of the spectral filter assembly of FIG. 6;

FIG. 8 is an exploded assembly view of another embodiment of a spectral filter assembly as in FIG. 5; and FIG. 9 is a cross-sectional view of the embodiment of the spectral filter assembly of FIG. 8.

DETAILED DESCRIPTION OF THE PREFERRED EMBODIMENTS

FIG. 1 illustrates a lamp system embodiment of the present invention, referred to herein by the general reference numeral 10. The system 10 comprises an arc lamp 12 fitted to a cathode heat sink 14 and an anode heat sink 16 that all slip into a plastic holder 18 with a draw pull 19. A light grille 20 mounts to the front of the holder 18, the whole of which drops into a frame 22. An insulator 24 supports a cathode connector 26 and an anode connector 30 all mounted to an insulator plate 32. The cathode connector 26 and the anode connector 30 make electrical contact with the arc lamp 12 through the heat sinks 14 and 16 and through holes in the bottom of the plastic holder 18. A first fan 34 and a second fan 36 are mounted in series with one another to force a cooling air flow axially through the holder 18 and the heat sinks 14 and 16. A fan grill 38 protects the fans. A clip 40 helps cinch the heat sink 14 around the arc lamp 12.

FIGS. 2 and 3 show a heat sink 50, similar to heat sinks 14 AND 16 of FIG. 1, which comprises an outer fin support 52, an inner fin support 54 and a pleated fin material 56. Preferably, the fin supports 52 and 54 and the fin material 56 comprise nickel-plated copper. The fin supports 52 and 54 are coaxial, circular cylindrical rings, and the fin material 56 is accordion-pleated into folds that are respectively cusil brazed at their outside and inside ends to the outer and inner fin supports 52 and 56. In one application, a device to be cooled, such as a thousand watt arc lamp in a projection system, is snug-fit within the inner fin support 54 and cooling air is forced through the fins formed by pleating the fin material 56. A gap 58 provides access for fasteners to secure the inner fin support 54 to the device to be cooled and/or access for electrical connections. In a typical arc lamp application, the inner fin support 54 has a nominal diameter of 2.590 inches and the outer fin support 52 has a nominal diameter of 3.718 inches. Both fin supports 52 and 54, in such a case, have a height of 1.200 inches and are 0.032 inch thick copper material.

The heat sink 50 is very efficient because it provides numerous cooling fins with very thin cross-sections. Preferably, the pleating of the fin material 56 produces as many as 130 total fins that are 0.012 inches thick, 0.500 inches along the axis of heat sink 50 and 1.20 inches in radial length between the fin supports 52 and 54. The gap 58 is preferably 0.400 inches wide.

FIG. 4 shows an arc lamp 60 with a pair of heat sinks 62 and 64 that are similar to the arc lamp 12 and heat sinks 14 and 16. A spectral filter assembly 66 with a filter window 68 and a retainer flange 70 is bolted to the front of the arc lamp 60 and heat sink 62. A substantial heat load is sustained by the filter window 68 as a result of the intense radiation passing through it, and such heat is edge connected to the heat sink 62. The arc lamp 60 comprises a window 72, a cathode electrode 74 and an anode electrode 76 that sustain an electric arc between them to produce an intense light at the point "A". Light from a point "A" is reflected by an elliptical reflector 78 through a window 72 and window filter 68 to a point "B".

Because the light from the arc lamp 60 is not output in a parallel beam, and it is focused at the relatively near point "B", the diameter of the window 72 can be substantially smaller than the diameter of the arc lamp 60 itself. The high power levels of the arc lamp 60 necessitate the use of sapphire, or other expensive materials for the window 72. If the window 72 were the full width of the arc lamp 60, the material in the outer perimeter of the window 72 would be wasted. In an arc lamp 60 with a diameter of two inches, the windows 68 and 72 preferably have diameters of one and three-eighths inches. An objective in such window diameter reduction is to save the cost of expensive materials that is possible, given the optics of the reflector 78.

FIG. 5 illustrates another type of arc lamp 80 with a pair of heat heats 82 and 84. A spectral filter assembly 86 fits inside the front inside edge of the heat sink 82. The arc lamp 80 is similar to the arc lamp 60 and has a front window 88, a cathode electrode 90, an anode electrode 92 and a reflector 94.

FIGS. 6 and 7 show a spectral filter assembly 100 similar to the filter assembly 86. The spectral filter assembly 100 comprises a retainer ring 102, a flat filter window (e.g., a "hot mirror") 104 with one or more optical coatings, and a copper heat transfer ring 106. The window 104 may comprise quartz or sapphire with optical coatings that are conventional and, alternative to being a hot mirror type, selectively block or pass ultra-violet, visible and infrared light. When a hot mirror, the filter window 104 reflects heat back to the arc lamp. This and other heat is conducted away to the copper heat transfer ring 106 through a close fitting joint seal. The retainer ring 102 keeps the window 104 in place.

FIGS. 8 and 9 show a spectral filter assembly 110 similar to the filter assembly 100, but configured to adapt a smaller diameter filter glass to the heat sink opening. The spectral filter assembly 110 comprises a retainer ring 112, a flat filter window 114 with one or more optical coatings, and a copper heat transfer ring 116. The heat transfer ring 116 is much larger in its outside diameter than in the inside diameter where the window 114 fits inside. As introduced in a first configuration in FIG. 5, this permits a reduction in the diameter of the filter window 114 for arc lamps with close-in focus points. Being able to reduce the diameter of the window 114 means that material costs can be saved. Any heat build up in the window 114 is passed to the copper heat transfer ring 116 by conduction. The retainer ring 112 keeps the window 114 in place. The copper heat transfer ring 116 is a press-fit into the heat sink, e.g., heat sink 82.

Preferably, the window 114 is a loose fit at room temperatures to allow for thermal expansion during operation and thus avoid cracking.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A drop-in lamp assembly for docking in a holder, comprising:

a heat transfer ring with an outside diameter and an inside diameter;

a filter window fitted within said inside diameter of the heat transfer ring providing for any heat in the window to be conducted out through the heat transfer ring;

a retainer ring snapped in-place in front of the window and inside said inside diameter of the heat transfer ring, wherein the filter window is held in place in the heat transfer ring;

a cylindrical arc lamp with a cathode ring and an anode ring for electrical connection and heat conduction for cooling;

a cathode heat sink attached to said cathode ring for cooling the arc lamp and filter window during operation;

an anode heat sink attached to said anode ring for cooling the arc lamp during operation; and an insulative sleeve including a cylindrical through-hole within which are disposed the arc lamp, the cathode heat sink and the anode heat sink, and further including a pair of bushings which pierce a wall of the sleeve and provide for electrical connection to and mechanical retention of the arc lamp, the cathode heat sink and the anode heat sink and further provide for connection to a pair of terminals in which said insulative sleeve docks.

2. The assembly of claim 1, wherein:

the arc lamp includes an elliptical reflector and a window having a diameter substantially smaller than the diameter of the arc lamp itself, wherein window material is conserved and said window diameter is not so constricted as to throttle substantial light output from the arc lamp given the optical characteristics of said elliptical reflector.

3. The assembly of claim 1, wherein:

the arc lamp includes a window for passing through light output from the arc lamp and a metal heat conduction flange that surrounds the outside perimeter of said window and provides for the conduction of heat generated in the window to the cathode heat sink.

4. A lamp system, comprising:

a heat transfer ring with an outside diameter and an inside diameter;

a filter window fitted within said inside diameter of the heat transfer ring providing for any heat in the window to be conducted out through the heat transfer ring;

a retainer ring snapped in place in front of the window and inside said inside diameter of the heat transfer ring, wherein the filter window is held in place in the heat transfer ring;

a cylindrical arc lamp with a cathode ring and an anode ring for electrical connection and heat conduction for cooling;

a cathode heat sink attached to said cathode ring for cooling the arc lamp during operation;

an anode heat sink attached to said anode ring for cooling the arc lamp during operation;

an insulative sleeve including a cylindrical through-hole within which are disposed the arc lamp, the cathode heat sink and the anode heat sink, and further including a pair of bushings which pierce a wall of the sleeve and provide for electrical connection to and mechanical retention of the arc lamp, the cathode heat sink and the anode heat sink;

a metal box housing providing for docking of the insulative sleeve and including openings at opposite ends providing for a cooling air flow through the cathode and anode heat sinks;

a fan attached to the metal box housing providing for a forced-air flow through said holes and through the cathode and anode heat sinks for cooling of the arc lamp during operation; and an insulating board attached to the metal box providing for support of a pair of electrical terminals to contact the cathode and anode heat sinks and to provide power to operate the arc lamp.

5. The system of claim 4, wherein the cathode and anode heat sinks each comprise:

an inner fin support of metal formed in a cylindrical ring;

an outer fin support of metal formed in a cylindrical ring and coaxial with the inner fin support; and a metal fin material in a rectangular strip and accordion-pleated into folds and brazed to each of the inner and outer fin supports to form a plurality of fins parallel to an axis of both the inner and outer fin supports.

6. The system of claim 5, wherein:

the inner and outer fin supports comprise nickel plated copper material approximately 0.032 inches thick; and the metal fin material comprises nickel plated copper material approximately 0.012 inches thick.

7. The system of claim 5, wherein:

the arc lamp includes an elliptical reflector and a window having a diameter substantially smaller than the diameter of the arc lamp itself, wherein window material is conserved and said window diameter is not so constricted as to throttle substantial light output from the arc lamp given the optical characteristics of said elliptical reflector.

8. The system of claim 4, wherein:

the arc lamp includes a window for passing through light output from the arc lamp and a metal heat conduction flange that surrounds the outside perimeter of said window and provides for the conduction of heat generated in the window to the cathode heat sink.

9. The system of claim 4, wherein:

the arc lamp includes an elliptical reflector and a window of a transparent material having a diameter substantially smaller than the diameter of the arc lamp itself, wherein window material is conserved and said window diameter is not so constricted as to throttle substantial light output from the arc lamp given the optical characteristics of said elliptical reflector; and a metal heat conduction flange that surrounds the outside perimeter of said window and provides for the conduction of heat generated in the window to the cathode heat sink.

10. A modular packaged lamp assembly, comprising:

a heat transfer ring with an outside diameter and an inside diameter;

a filter window fitted within said inside diameter of the heat transfer ring providing for any heat in the window to be conducted out through the heat transfer ring;

a retainer ring snapped in place in front of the window and inside said inside diameter of the heat transfer ring, wherein the filter window is held in place in the heat transfer ring;

a cylindrical arc lamp with a cathode ring and an anode ring for electrical connection and heat conduction for cooling, an elliptical reflector and a window of transparent material having a diameter substantially smaller than the diameter of the arc lamp itself, wherein window material is conserved and said window diameter is not so constricted as to throttle substantial light output from the arc lamp given the optical characteristics of said elliptical reflector;

a cathode heat sink attached to said heat transfer ring and said cathode ring, and having an inner fin support of metal formed in a cylindrical ring, an outer fin support of metal formed in a cylindrical ring and coaxial with the inner fin support, and a metal fin material in a rectangular strip and accordion-pleated into folds and brazed to each of the inner and outer fin supports to form a plurality of fins parallel to an axis of both the inner and outer fin supports;

an anode heat sink attached to said anode ring, and having an inner fin support of metal formed in a cylindrical ring, an outer fin support of metal formed in a cylindrical ring and coaxial with the inner fin support, and a metal fin material in a rectangular strip and accordion-pleated into folds and brazed to each of the inner and outer fin supports to form a plurality of fins parallel to an axis of both the inner and outer fin supports;

a metal box housing enclosing the arc lamp and attached cathode and anode heat sinks and including holes providing for air flow through the cathode and anode heat sinks;

a fan attached to the metal box housing providing for a forced-air flow through said holes and through the cathode and anode heat sinks for cooling of the arc lamp; and an insulating board attached to the metal box providing for support of a pair of electrical terminals to contact the cathode and anode heat sinks and to provide power to operate the arc lamp.

11. A spectral filter assembly for direct attachment to an arc lamp and surrounding radial cathode heat sink, comprising:

a heat transfer ring with an outside diameter for attachment to an arc lamp and surrounding radial cathode heat sink and an inside diameter;

a filter window fitted within said inside diameter of the heat transfer ring providing for any heat in the window to be conducted through the heat transfer ring to said surrounding radial cathode heat sink; and a retainer ring snapped in place in front of the window and inside said inside diameter of the heat transfer ring, wherein the filter window is held in place in the heat transfer ring.

12. The assembly of claim 11, wherein:

said outside diameter of the heat transfer ring is substantially larger in diameter than said inside diameter, wherein a relatively smaller filter window is provided.

\* \* \* \* \*